(12) United States Patent
Takikawa et al.

(10) Patent No.: US 9,926,993 B2
(45) Date of Patent: Mar. 27, 2018

(54) COIL SPRING

(71) Applicant: AISIN AW CO., LTD., Anjo-shi, Aichi-ken (JP)

(72) Inventors: Yoshihiro Takikawa, Tsushima (JP); Yasuhiro Watanabe, Nishio (JP)

(73) Assignee: AISIN AW CO. LTD., Anjo-Shi, Aichi-Ken (JP)

( * ) Notice: Subject to any disclaimer, the term of this patent is extended or adjusted under 35 U.S.C. 154(b) by 0 days.

(21) Appl. No.: 15/310,826

(22) PCT Filed: Jul. 7, 2015

(86) PCT No.: PCT/JP2015/069573
§ 371 (c)(1),
(2) Date: Nov. 14, 2016

(87) PCT Pub. No.: WO2016/006616
PCT Pub. Date: Jan. 14, 2016

(65) Prior Publication Data
US 2017/0108072 A1  Apr. 20, 2017

(30) Foreign Application Priority Data
Jul. 7, 2014 (JP) ................................. 2014-139787

(51) Int. Cl.
*F16F 1/06* (2006.01)
*F16F 1/02* (2006.01)
(Continued)

(52) U.S. Cl.
CPC ................ *F16F 1/06* (2013.01); *F16F 1/028* (2013.01); *F16F 1/047* (2013.01); *F16D 3/12* (2013.01);
(Continued)

(58) Field of Classification Search
CPC ........ F16F 1/06; F16F 1/028; F16F 2238/026; F16H 45/02
See application file for complete search history.

(56) References Cited

U.S. PATENT DOCUMENTS 5,259,599 A    11/1993  Hernandez
8,684,342 B2*  4/2014   Fenioux ................. F16F 1/042
                                                          267/166
(Continued)

FOREIGN PATENT DOCUMENTS

JP    05-196074 A     8/1993
JP    10-082440 A     3/1998
JP    2008-185072 A   8/2008

OTHER PUBLICATIONS

International Search Report of PCT/JP2015/069573 dated Aug. 11, 2015.

*Primary Examiner* — Vishal R Sahni
(74) *Attorney, Agent, or Firm* — Sughrue Mion, PLLC

(57) ABSTRACT

A coil spring is formed by winding a wire in a coil shape. In the cross sectional shape of the wire formed in the coil shape, the inner diameter side part in the coil shape includes a semi-elliptical shape having a major radius and a minor radius and the outer diameter side part in the coil shape includes a curved shape circumscribing a circumscribed circle having a radius larger than the minor radius, arc shapes having a curvature larger than the curvature of the circumscribed circle, and linear shapes connecting both ends of the arc shapes to both ends of the semi-elliptical shape. This can increase the cross sectional shape of the wire, reduce a shearing stress, and improve the durability of the coil spring.

20 Claims, 10 Drawing Sheets

(51) Int. Cl.
*F16F 1/04* (2006.01)
*F16F 15/134* (2006.01)
*F16H 45/02* (2006.01)
*F16D 3/12* (2006.01)

(52) U.S. Cl.
CPC ....... *F16F 15/134* (2013.01); *F16F 2238/026* (2013.01); *F16H 45/02* (2013.01); *F16H 2045/0221* (2013.01)

(56) References Cited

U.S. PATENT DOCUMENTS

| | | | |
|---|---|---|---|
| 2010/0090384 A1* | 4/2010 | Fenioux | F16F 1/042 267/166 |
| 2011/0031667 A1* | 2/2011 | Isobe | F16F 1/042 267/180 |
| 2014/0057729 A1 | 2/2014 | Kombowski | |

* cited by examiner

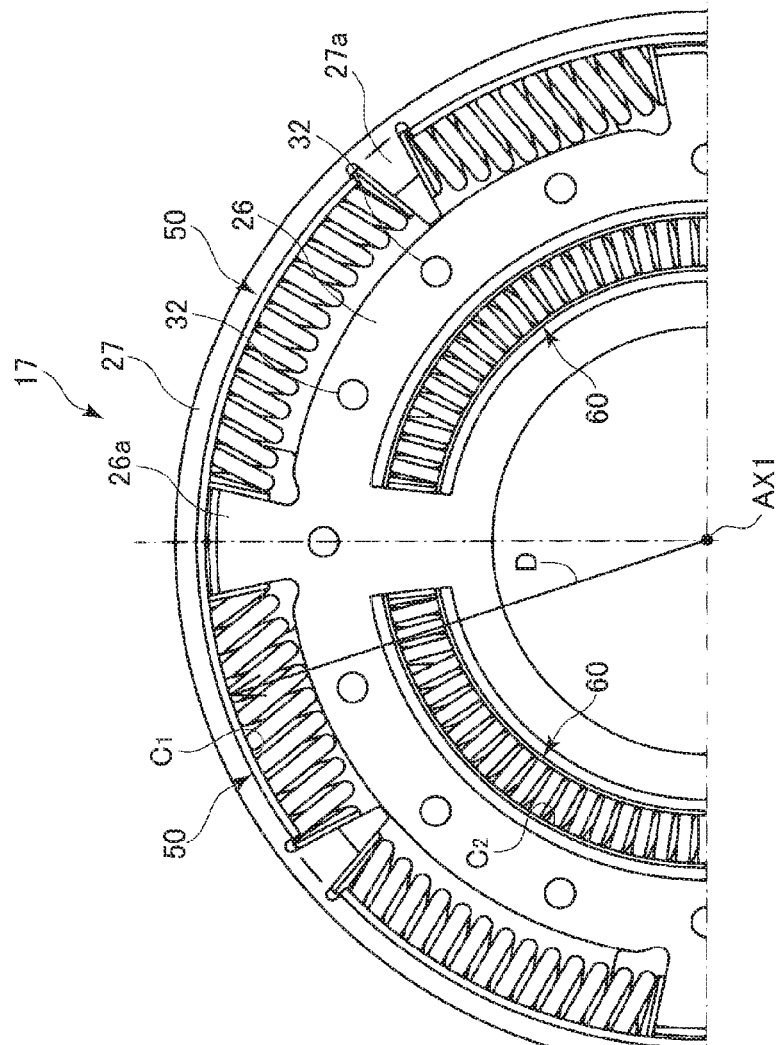
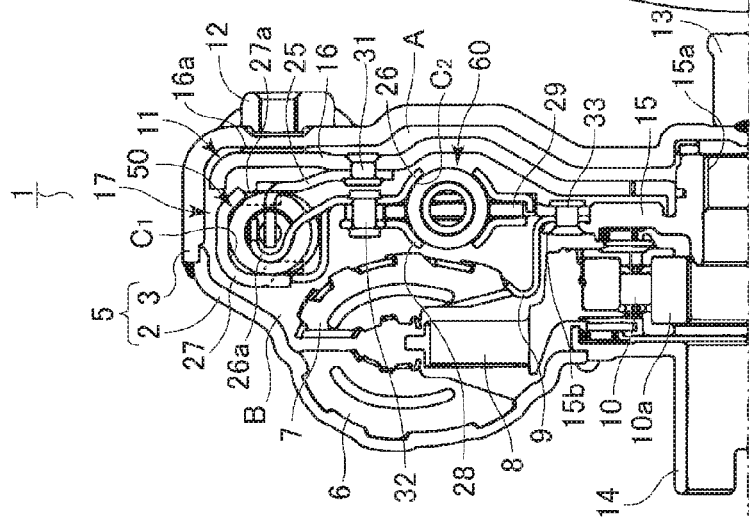

COIL SPRING

TECHNICAL FIELD

This technique relates to a coil spring used in a damper device of a transmission or the like mounted in, for example, a vehicle.

BACKGROUND ART

Generally, an automatic transmission or manual transmission mounted in a vehicle or the like is provided with a damper device for absorbing vibrations transferred from an internal combustion engine and transferring rotation to a transmission mechanism. The damper device generally includes a drive plate, a driven plate, and a coil spring present therebetween. The coil spring provided in the damper device is manufactured by winding one wire in a coil shape. The general basic shape of the cross section of the wire is a circle as a simple shape or an egg shape obtained by combining a semi-elliptical shape having, for example, a major radius a and a minor radius b with a semicircle having a radius b (see Patent Document 1).

By the way, when the wire is thicken (that is, the wire has a large cross sectional area), the durability is improved, but the wire cannot be wound so as to be accommodated in the storage space of the damper device when the wire is too thick, so it is impossible to simply thicken the wire. In addition, when the cross sectional shape of the wire is rectangular to simply increase the cross sectional area, the shearing stress or twisted stress generated by extension and contraction of the coil spring concentrates on corners and fatigue cracks are generated earlier, thereby resulting in degradation of durability.

In addition, there is proposed a coil spring having linear portions extending in an inner-outer diameter direction in the cross sectional shape of the wire (that is, a planar abutting plane is provided on the side surface of the wire) to distribute the stress generated when the coil spring contracts and adjacent wires abut against each other (see Patent Document 2).

In addition, since a coil spring provided in the damper device of a transmission or the like receives a centrifugal force during rotation, the damper device is provided with a semi-cylindrical cover for preventing the coil spring from being thrown off by the centrifugal force. However, since the coil spring is pushed against the cover during rotation by a centrifugal force, a stress is generated in the outer diameter side part of the wire by the pushing force. The contact part of the wire with the above cover receives the stress generated by the centrifugal force and the shearing stress generated by extension and contraction of the coil spring, so the durability may be affected. Accordingly, there is proposed a coil spring in which linear portions are provided in the outer diameter side part of the wire to make the shape of the outer diameter side part different from the shape of the inner diameter side part (see Patent Document 3).

RELATED-ART DOCUMENTS

Patent Documents

Patent Document 1: JP-A-10-82440
Patent Document 2: JP-A-2008-185072
Patent Document 3: U.S. Patent Application Publication No. 2014/0057729

SUMMARY

Technical Problem

By the way, the cross sectional area (thickness) of the wire may be increased to improve the durability against the shearing stress generated during extension and contraction of the coil spring. However, since a shearing stress is easily caused in a portion in which a curvature changes greatly, it is necessary to minimize the curvature change while increasing the cross sectional area. However, when the inner diameter side part of the wire is configured by arc portions and straight lines as described in Patent Document 3, the curvature changes greatly at parts at which the arc portions are connected to the linear portions and a shearing stress easily concentrates, thereby making the improvement of durability difficult.

Accordingly, an object is to provide a coil spring having a cross sectional shape of the wire in which the cross sectional area of the wire can be increased and a shearing stress can be reduced.

Solution to Problem

An embodiment for solving the above problem is directed to a coil spring formed by winding a wire in a coil shape, in which a cross sectional shape of an inner diameter side part of the wire in the coil shape includes a semi-elliptical shape having a major radius and a minor radius, the major radius being oriented in an inner-outer diameter direction, a cross sectional shape of an outer diameter side part of the wire in the coil shape includes a curved shape circumscribing a circumscribed circle having a radius larger than the minor radius, arc shapes having a curvature larger than a curvature of the circumscribed circle, and linear shapes connecting both ends of the arc shapes to both ends of the semi-elliptical shape.

Therefore, the outer diameter side part includes a curved shape circumscribing a circumscribed circle having a radius longer than the minor radius, arc shapes having a large curvature, and linear shapes, so the cross sectional area of the wire is larger than in a wire having, for example, a semicircular outer diameter side part. In addition, since the inner diameter side part is a semi-elliptical shape and the inner diameter side part is connected to the linear shapes of the outer diameter side part, the curvature changes slightly and a shearing stress does not easily concentrate. Since the cross sectional area is large and the curvature changes slightly as described above, a shearing stress can be distributed and the durability of the coil spring can be improved.

BRIEF DESCRIPTION OF DRAWINGS

FIG. 1A is a cross sectional view illustrating an example of a damper device of an automatic transmission and FIG. 1B is a front view illustrating a damper portion of the damper device of the automatic transmission in which a part is omitted.

DESCRIPTION OF EMBODIMENTS

<First Embodiment>

Figure 2A:
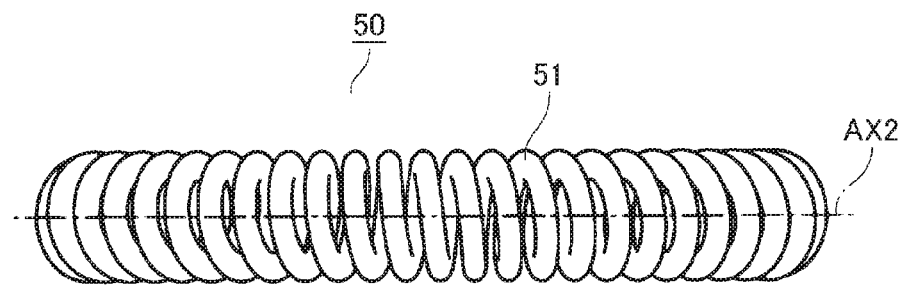
FIG. 2A is a side view illustrating an arc-shaped coil spring according to the embodiment.

The first embodiment will be described with reference to FIG. 1 to FIG. 7. First, the structure of a torque converter 1 of an automatic transmission to which a coil spring 50 according to the first embodiment is applicable and the structure of a damper portion 17 incorporated therein will be described with reference to FIG. 1.

As illustrated in FIG. 1A and FIG. 1B, the torque converter 1 has a housing 5 to which a rear cover 2 and a front cover 3 are integrally welded, and the housing 5 accommodates a pump impeller 6, a turbine runner 7, a stator 8, and a lock-up clutch 11. The pump impeller 6 includes many blades fixed to the rear cover 2, the turbine runner 7 includes many blades fixed to an outer hull plate 9, and the stator 8 includes many blades placed on a one-way clutch 10.

A center piece 13 is anchored to the center of the front cover 3, a set block 12 is anchored to the periphery portion of the front cover 3, the above center piece 13 is fitted to an engine crankshaft (not illustrated) for proper alignment, the set block 12 is coupled via a flexible plate, and the rotation of the crankshaft is transferred to the housing 5. A pump side boss 14 is anchored to the rear side surface of the rear cover 2 and a turbine side boss 15 is coupled to the outer hull plate 9 of the turbine runner 7. The pump side boss 14 is rotatably supported by a pump case (not illustrated) integrated with a mission case and the pump side boss 14 and the center piece 13 support the housing 5. The above turbine side boss 15 is spline-engaged with an input shaft (not illustrated) of an automatic transmission mechanism via a spline 15a and an inner race 10a of the above one-way clutch 10 is fixed to the pump case via a stator shaft (not illustrated).

The lock-up clutch 11 has a clutch plate 16 detachably disposed on the inner wall of the front cover 3 and the lock-up clutch 11 is engaged or released by switching a flow of oil supplied to oil chambers A and B in the above housing 5 partitioned by the clutch plate 16. The clutch plate 16 is rotatably and slidably (in the axial direction) supported by the turbine side boss 15 in an oil-tight manner and a frictional material 16a is anchored to the engine side on the outer diameter side. The lock-up clutch 11 is released when oil flows from the oil chamber A to the oil chamber B and the lock-up clutch 11 is engaged when oil flows from the oil chamber B to the oil chamber A.

The damper portion (damper device) 17 is present between the above clutch plate 16 and the turbine runner 7. The damper portion 17 mainly includes a drive plate (rotating body) 25, a first driven plate (rotating body) 26, a cover plate (cover) 27, an auxiliary plate 28, a second driven plate 29, accommodate portions $C_1$ and $C_2$ disposed in two different positions in the radial direction, and the coil spring 50 and a coil spring 60 accommodated in the accommodate portions $C_1$ and $C_2$ along the rotary direction. These coil springs 50 and 60 are arc springs so as to be accommodated in the arc-shaped accommodate portions $C_1$ and $C_2$.

Specifically, the drive plate 25 is anchored to the clutch plate 16 via a rivet 31. A cover plate 27 is anchored to the outer diameter side of the drive plate 25 (one rotating body) via welding or the like and a projecting portion 27a of the cover plate 27 abuts against one end of the coil spring 50. This causes the drive plate 25 and the cover plate 27 to transfer a rotary force to the coil spring 50 when the lock-up clutch 11 is engaged. The cover plate 27 is semi-cylindrical in sectional view and forms the space of the above accommodate portion $C_1$. In addition, the accommodate portion $C_1$ of the cover plate 27 has an inner peripheral surface having a radius D about a center axis AX1 (rotational shaft) of the torque converter 1 and, that is, the coil spring 50 is inscribed in an inscribed circle having the radius D.

The first driven plate 26, which is one of the driven plates, forms the inner diameter side of the accommodate portion $C_1$ and has an abutment portion 26a abutting against the other end of the coil spring 50. This causes the coil spring 50 to be present between the drive plate 25 and the first driven plate 26 via the cover plate 27.

In addition, the first driven plate 26 is fixed to the auxiliary plate 28 on the inner diameter side via rivets 32 and the first driven plate 26 and the auxiliary plate 28 constitute the accommodate portion $C_2$ for accommodating the coil spring 60. The first driven plate 26 abuts against one end of the coil spring 60 via a projecting portion (not illustrated).

In addition, the second driven plate 29 is disposed between the first driven plate 26 and the auxiliary plate 28 slidably in the rotary direction. The second driven plate 29 abuts against the other end of the coil spring 60 via the abutment portion (not illustrated). This causes the coil spring 60 to be present between the first driven plate 26 and the second driven plate 29.

The second driven plate 29, a flange section 15b of the turbine side boss 15, and the outer hull plate 9 are anchored by a rivet 33 on the inner diameter side. That is, the second driven plate 29 is supported by the turbine side boss 15. Accordingly, the first driven plate 26, the auxiliary plate 28, the coil spring 60, and the like are supported by the turbine side boss 15 via the second driven plate 29.

Although the plates and the like are anchored and tightened via the rivets 31, 32, and 33 in the embodiment, other embodiments may be used and joint means such as welding may be used. In addition, although the cover plate 27 is anchored to the drive plate 25 in the embodiment, the cover plate 27 may be anchored to the first driven plate 26. In this case, the drive plate 25 abuts against one end of the coil spring 50 and the first driven plate 26 or the cover plate 27 abuts against the other end. In addition, although the cover plates 27 may be anchored to one of the drive plate 25 and the first driven plate 26, for example, the half of them may be anchored to the drive plate 25 and the remaining half may be anchored to the first driven plate 26. That is, the cover plates 27 only need to be provided in one of the rotating bodies.

Since the structure described above is used, when oil flows from the oil chamber A to the oil chamber B in the housing 5 and the lock-up clutch 11 is in a release state, the rotation of the engine crankshaft is transferred to the pump impeller 6 via the housing 5, transferred to the turbine runner 7 by a flow of fluid circulating the pump impeller 6, the turbine runner 7, and the stator 8, and transferred to the input shaft of the automatic transmission mechanism via the turbine side boss 15 and the rotation changed as appropriate by the automatic transmission mechanism is transferred to the wheels.

By selecting the flow of oil from the oil chamber B to the oil chamber A, when the lock-up clutch 11 is in an engagement state, the rotation of the engine crankshaft is transferred directly to the turbine side boss 15 from the front cover 3 via the lock-up clutch 11, the drive plate 25, the cover plate 27, the coil spring 50, a first driven plate 26 and the auxiliary plate 28, the coil spring 60, and the second driven plate 29. In mechanical power transfer via the lock-up clutch 11, on-off of the accelerator, in-out of the lock-up clutch, on-off of the clutch and brake of the automatic transmission mechanism, and torque fluctuations accompanied by explosive vibrations of the engine are absorbed as appropriate by the coil springs 50 and 60 having different oscillation frequencies.

Since the coil springs 50 and 60 absorb vibrations by repeating extension and contraction at this time, the coil springs 50 and 60 slide along the inner surfaces of the accommodate portions $C_1$ and $C_2$. Since particularly the damper portion 17 rotates together with engine rotation according to the engagement state of the lock-up clutch 11, a centrifugal force is applied to the coil springs 50 and 60 and movement to the outer diameter side is limited by the accommodate portions $C_1$ and $C_2$, that is, the coil springs 50 and 60 slide on the inner peripheral surface on the outer diameter side of the accommodate portions $C_1$ and $C_2$. Particularly, the coil spring 50 described below is pushed against the accommodate portion $C_1$ (that is, the inner peripheral surface having the radius D of the cover plate 27) by a centrifugal force and slides on the inner peripheral surface. Since the coil spring 50 is disposed on the outer diameter side of the coil spring 60, a larger centrifugal force is generated.

Next, in describing the structure of the coil spring 50 according to the first embodiment, a coil spring 250 of a conventional basic shape will be described for comparison based on FIG. 9A, FIG. 9B, FIG. 9C, FIG. 10A, and FIG. 10B.

Figure 9A:
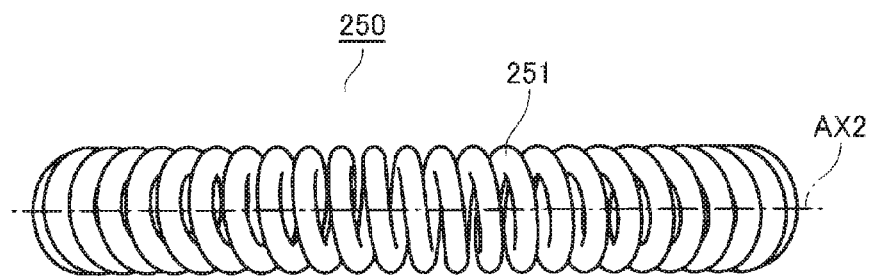
FIG. 9A is a side view illustrating an arc-shaped (conventional basic shape) coil spring.
Figure 9B:
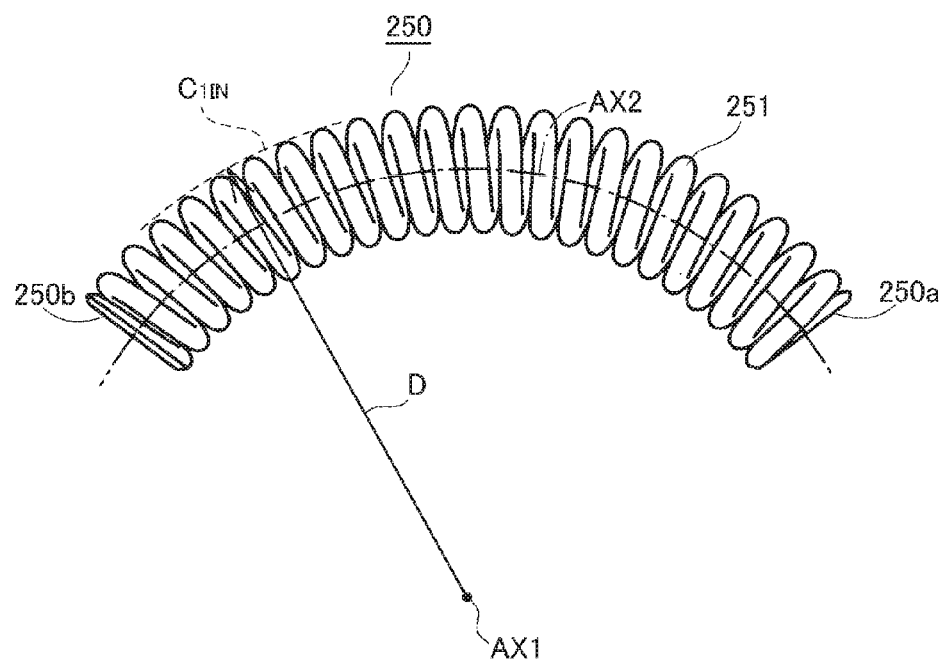
FIG. 9B is a front view illustrating the arc-shaped (conventional basic shape) coil spring.
Figure 9C:
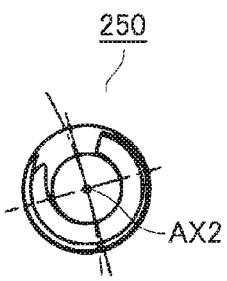
FIG. 9C illustrates the arc-shaped (conventional basic shape) coil spring seen from the coil axis direction.

The coil spring 250 of a conventional basic shape is formed by winding a wire 251 in a coil shape as illustrated in FIG. 9A, FIG. 9B, and FIG. 9C and a coil center axis AX2 is formed in an arc shape so that the coil spring 250 is accommodated in the accommodate portion $C_1$ about the center axis AX1 of the damper portion 17 (that is, the torque converter 1). Accordingly, the coil spring 250 slides during extension and contraction while an arc-shaped outer periphery part makes contact with an inscribed circle $C_{1IN}$ of an arc-shaped inner surface by a centrifugal force in the rotary direction of the accommodate portion $C_1$.

When accommodated in the accommodate portion $C_1$, the coil spring 250 is disposed while contracting so as to generate a designed biasing force with one end 250a abutting against, for example, the projecting portion 27a of the cover plate 27 and the other end 250b abutting against the abutment portion 26a of the first driven plate 26. The relationship between a cross sectional secondary moment and a number of active turns of the coil needs to be set as appropriate for the coil spring 250 to generate the designed biasing force.

When the cross sectional shape of the wire is, for example, a circle having a diameter d, the number of active turns is calculated as described below. That is, the cross sectional secondary moment Iz is represented by the following expressions.

[Math 1]
$$I_Z = \frac{\pi d^4}{64} \quad (1)$$

[Math 2]
$$d = 4\sqrt{\frac{64 I_Z}{\pi}} \quad (2)$$

The number of active turns Na is represented by the following expression when a transverse elastic coefficient is G, an average coil diameter is D, and a spring constant is k.

[Math 3]
$$N_a = \frac{G d^4}{8 D^3 k} \quad (3)$$

The following expression (4) is obtained by substituting expression (2) above into expression (3) above.

[Math 4]
$$N_a = \frac{8 G I_Z}{\pi D^3 k} \quad (4)$$

Figure 10A:
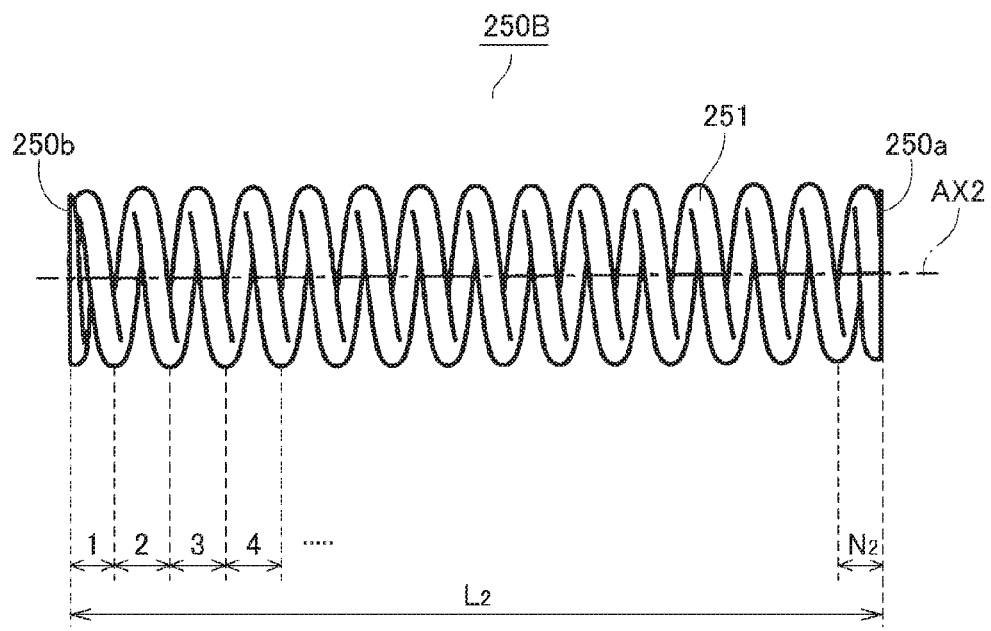
FIG. 10A is a side view illustrating a straight (conventional basic shape) coil spring and FIG. 10B is a cross sectional view illustrating the wire of the straight (conventional basic shape) coil spring.
Figure 10B:
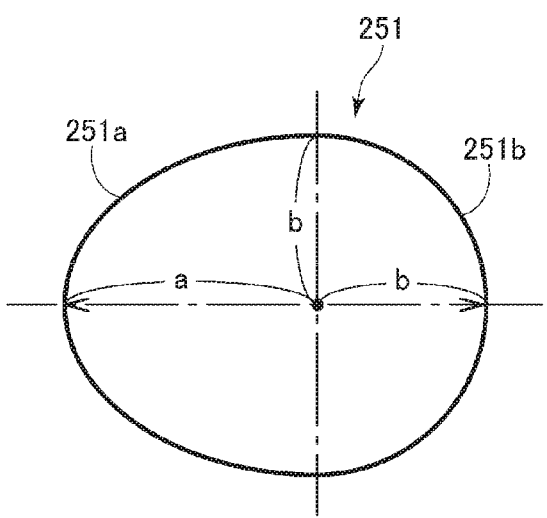

As illustrated in FIG. 10B, the cross sectional shape of the wire 251 of the coil spring 250 is obtained by combining a semi-elliptical shape 251a having the major radius a and the minor radius b with a semicircular shape 251b having the radius b. Accordingly, the number of active turns can be obtained by calculating the cross sectional secondary moment of the wire 251 in detail (not described because the calculation is complicated) and substituting the result into expression (3).

Accordingly, as illustrated in FIG. 10A, in a straight coil spring 250B having a length $L_2$ obtained by replacing the arc-shaped coil spring 250 with a straight coil spring, design is performed by assuming the number of turns from the one end 250a to the other and 250b to be $N_2$. Although the arc-shaped coil spring 250 is generally formed by bending the straight coil spring 250B like an arc, embodiments other than this method and the arc-shaped coil spring 250 may be formed concurrently with the winding of the wire 251 in a coil shape. That is, the method for forming the arc shape is arbitrary. Accordingly, the straight coil spring 250B is not only an example of the straight coil spring 250B, but also a shape before the arc-shaped coil spring 250 is formed.

Figure 2B:
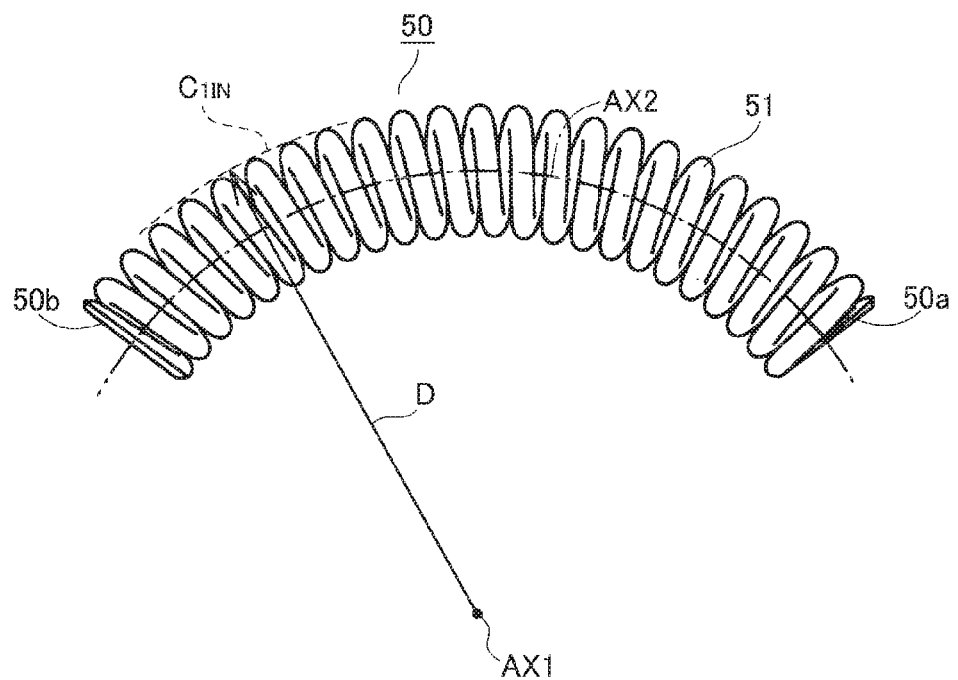
FIG. 2B is a front view illustrating the arc-shaped coil spring according to the embodiment.
Figure 2C:
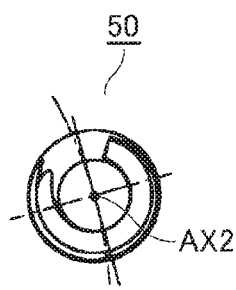
FIG. 2C illustrates the arc-shaped coil spring according to the embodiment seen from a coil axis direction.
Figure 3:
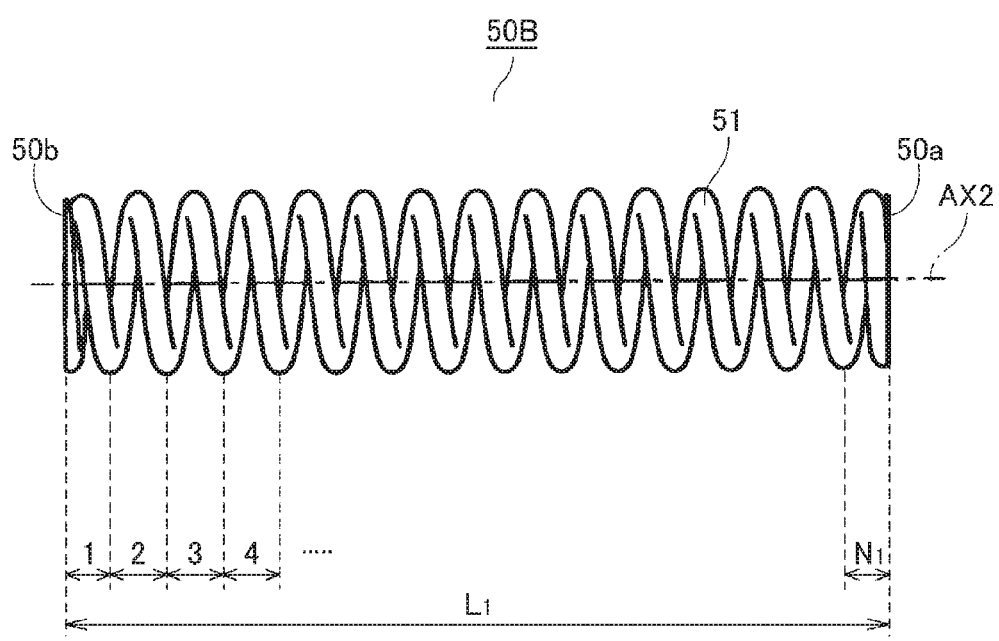
FIG. 3 is a side view illustrating a straight coil spring.
Figure 4:
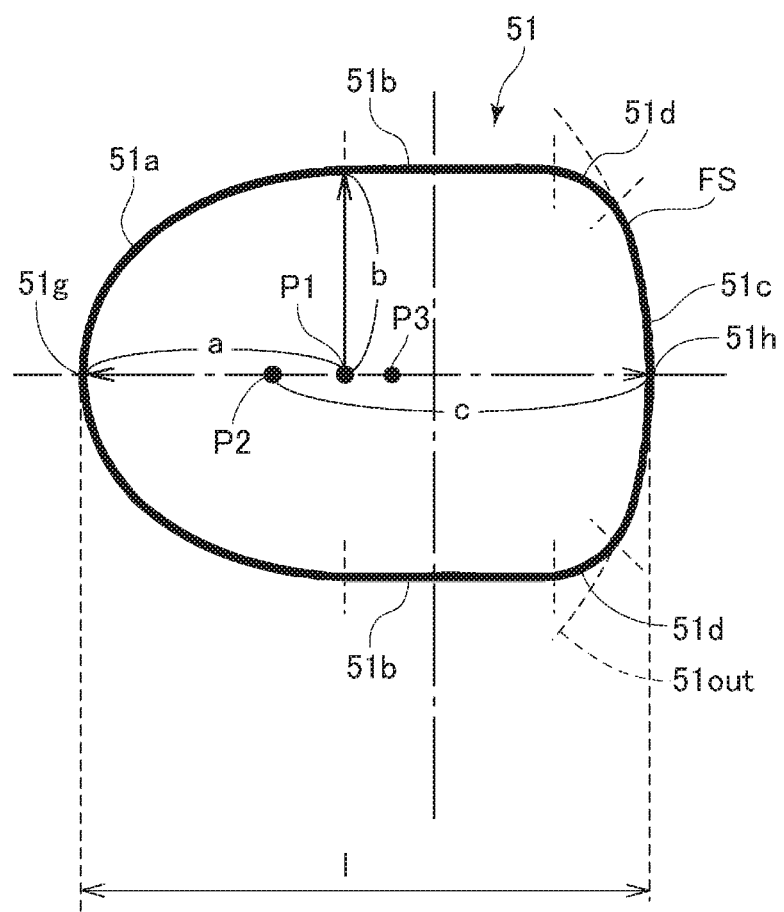
FIG. 4 illustrates the cross sectional shape of the wire of the coil spring according to the first embodiment.
Figure 5:
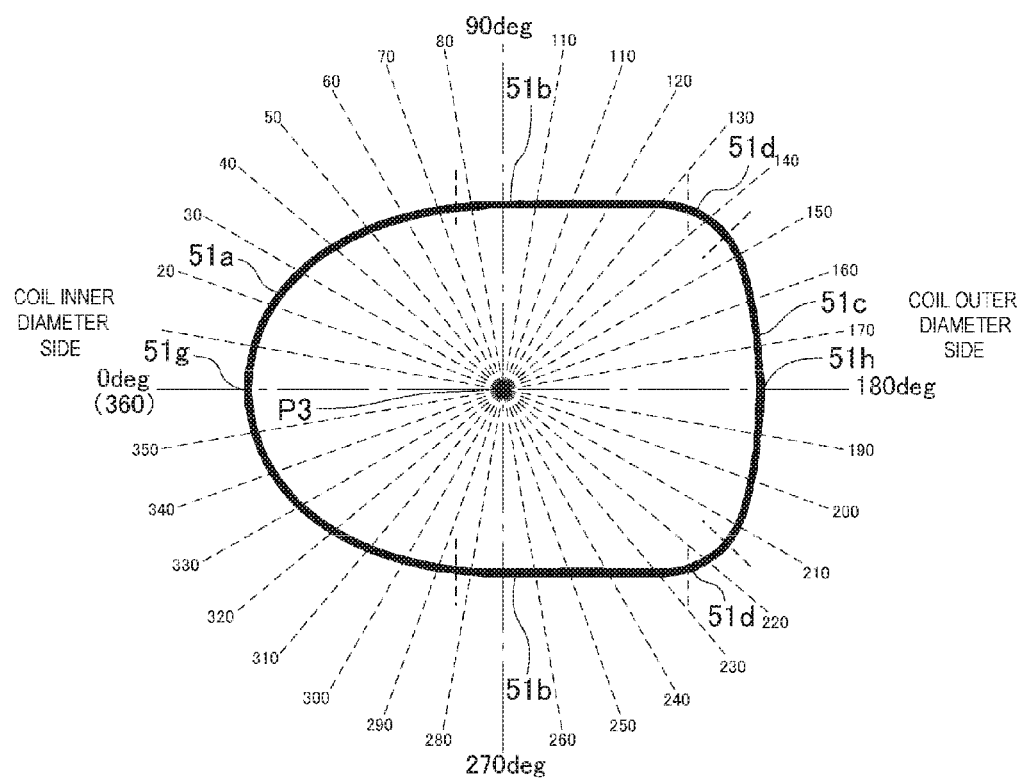
FIG. 5 illustrates the angle measured about the center of the wire of the coil spring according to the first embodiment.
Figure 6:
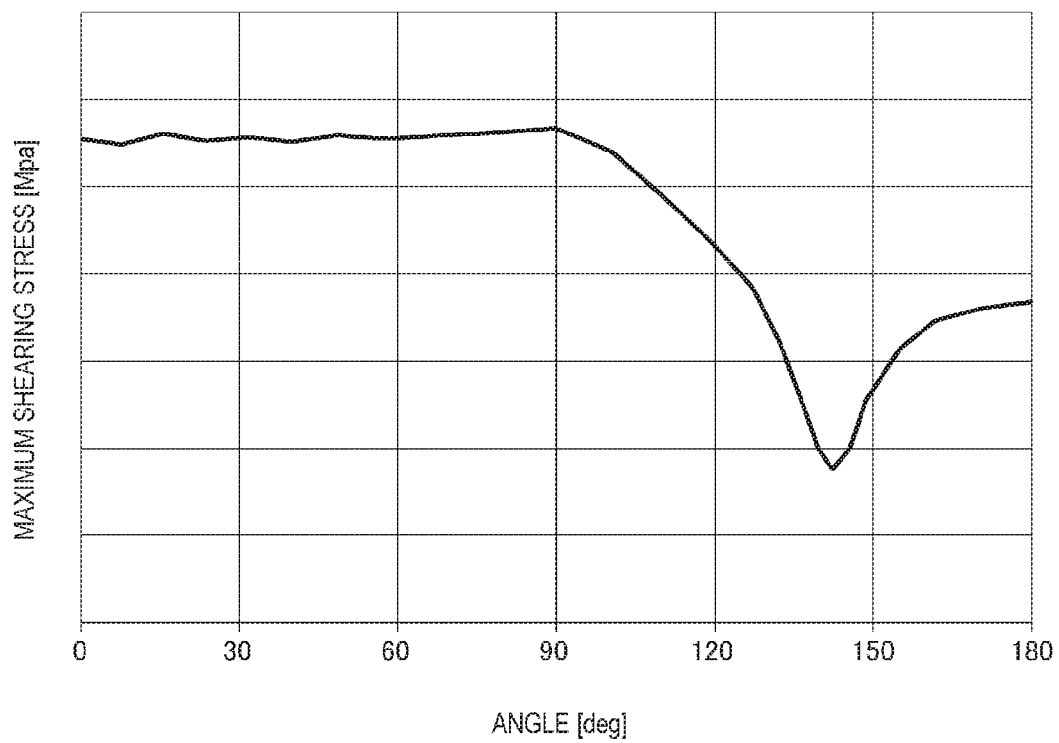
FIG. 6 illustrates the relationship between the angle in the cross section of the wire and the maximum shearing stress when the coil spring according to the first embodiment contracts.

Next, the coil spring 50 according to the embodiment will be described with reference to FIG. 2A, FIG. 2B, FIG. 2C, FIG. 3, FIG. 4, FIG. 5, FIG. 6, and FIG. 7. The coil spring 50 is formed by winding a wire 51 in a coil shape as illustrated in FIG. 2A, FIG. 2B, and FIG. 2C, and the coil center axis AX2 is formed in an arc shape so that the coil spring 50 is accommodated in the accommodate portion $C_1$ about the center axis AX of the damper portion 17 (that is, the torque converter 1). That is, the coil spring 50 is formed to have the arc-shaped outer periphery part of the radius D and slides during extension and contraction while making contact with the inscribed circle $C_{1IN}$ of the arc-shaped inner surface of the accommodate portion $C_1$ by a centrifugal force. The cross sectional shape of a wire before being wound in a coil shape is not strictly the same as the cross sectional shape of a wire after being wound in the coil shape to form a coil spring. The cross sectional shape of the wire 51 illustrated in FIG. 4 and FIG. 5 is the cross sectional shape of the wire after being wound in the coil shape to form the coil spring. That is, the "wire" in the following description represents the wire after being formed in a coil spring.

When accommodated in the accommodate portion $C_1$, the coil spring 50 is disposed while contracting so as to generate a designed biasing force with one end 50a abutting against, for example, the projecting portion 27a of the cover plate 27 and the other end 50b abutting against the abutment portion 26a of the first driven plate 26.

As illustrated in FIG. 4, the cross sectional shape of the wire 51 of the coil spring 50 is formed so as to include a semi-elliptical portion 51a formed in a semi-elliptical shape, linear portions 51b formed in linear shapes, arc portions 51d formed in are shapes, and a curved portion 51c formed in a curved shape. The wire 51 according to the embodiment is wound so that the semi-elliptical portion 51a is disposed on the inner diameter side and the curved portion 51c is disposed on the outer diameter side to form the coil spring 50. Accordingly, the outermost periphery part of the coil spring 50 formed by the curved portion 51c makes contact with and slides on the inscribed circle $C_{1IN}$ of the inner surface of the accommodate portion $C_1$.

The above semi-elliptical portion 51a is formed in the semi-elliptical shape defined by $(x/a)^\alpha+(y/b)^\alpha=1$ using the major radius a extending in the inner-outer diameter direction from a center point P1 and the minor radius b extending in the direction orthogonal to the major radius a and the semi-elliptical portion 51a forms the inner diameter side part in the coil shape. The value of $\alpha$ is generally 2, but any value may be used as long as an elliptical shape is represented. Although the semi-elliptical portion 51a is exactly the half of an elliptical shape in the embodiment, other embodiments may be used and the elliptical shape may be cut in any position in the direction (the direction parallel to the minor radius b or the direction slightly inclined with respect to the minor radius b) along the minor radius b. That is, a "semi-elliptical shape" in this specification is not the entire ellipse, but a part of the entire ellipse, so a semi-elliptical shape is not limited to the half of the entire ellipse as long as it is substantially semi-elliptical.

On the other hand, the curved portion 51c, the linear portion 51b, and the are portions 51d form the outer diameter side part in a coil shape, the curved portion 51c is an arc shape having a radius c about a center point P2 disposed in a center line extending in the inner-outer diameter direction so as to pass through the center point P1, and the curved portion 51c partially overlaps with a circumscribed circle 51out circumscribing the curved portion 51c in the first embodiment. The circumscribed circle 51out is designed to have a curvature smaller than in the inscribed circle $C_{1IN}$ of the inner surface of the accommodate portion $C_1$ in the embodiment. That is, the radius c is smaller than the radius D (see FIG. 2B). Therefore, when the curved portion 51c is pushed against the inner surface of the accommodate portion $C_1$ by a centrifugal force, the curvature is preferably set so as to maximize the area of a contact surface FS. The curvature of the curved portion 51c larger than that of the inscribed circle $C_{1IN}$ is not preferable because the contact surface floats and a stress concentrates only on the contact point.

In addition, the center point P2 of the curved portion 51c is positioned on the inner diameter side (in a coil shape) of the center point P1 of the semi-elliptical portion 51a and the radius c is larger than the radius b (see FIG. 10B) of the basic shape described above. That is, a length l between an inner diameter side end (the inner diameter side apex) 51g of the semi-elliptical portion 51a and the outer diameter side end (the outer diameter side apex or the outer diameter side end of the circumscribed circle 51out) 51h of the curved portion 51c is larger than the length obtained by adding the major radius a to the radius b of the basic shape. In addition, since the radius c of the circumscribed circle 51out (that is, the radius c of the curved portion 51c) is larger than the major radius a of the semi-elliptical portion 51a, the curvature of the curved portion 51c (circumscribed circle 51out) is smaller than the curvature of the semi-elliptical portion 51a.

As described above, since the radius c of the curved portion 51c is larger than the radius b (see FIG. 10B) of the above basic shape and the cross sectional area of the wire 51 is larger, the two straight linear portions 51b connect both ends of the semi-elliptical portion 51a (that is, two ends of the semi-elliptical portion 51a in the direction orthogonal to the inner-outer diameter direction that passes through the center point P1 of the semi-elliptical portion 51a) to both ends of the curved portion 51c via the arc portions 51d. The linear portions 51b extend in the inner-outer diameter direction and, more specifically, the parts of the linear portions 51b close to the semi-elliptical portion 51a are formed in parallel to the center line (of the cross sectional shape of the wire 51) connecting the center points P1 and P2. In addition, the parts of the linear portions 51b close to the curved portion 51c are curved and smoothly and continuously connected to the curved portion 51c via the arc portions 51d and have rounded corners R for preventing concentration of a stress. The curvature of the arc portion 51d is larger than the curvature of the curved portion 51c (circumscribed circle 51out) (the radius is smaller). Although the linear portions 51b are disposed in parallel to the inner-outer diameter direction in the embodiment, the linear portions 51b may be disposed obliquely with respect to the inner-outer diameter direction.

Referring to FIG. 5, the positional relationship among the semi-elliptical portion 51a, the linear portions 51b, the curved portion 51c, and the arc portions 51d will be described based on their angles. A center P3 illustrated in FIG. 5 is positioned in the middle of the straight line having the length l between the inner diameter side end (inner diameter side apex) 51g of the semi-elliptical portion 51a and the outer diameter side end (the outer diameter side apex or the outer diameter side end of the circumscribed circle 51out) 51h of the curved portion 51c and, as a matter of course, the center P3 is positioned in the middle in the width direction of the wire 51 in the direction of the minor radius b (that is, the center of the circumscribed rectangle circumscribing the wire 51).

When the center P3 is the center of the cross sectional shape of the wire 51 and the inner diameter side end 51g is set as 0 degrees, the semi-elliptical portion 51a is disposed in the region from 0 degrees to 90 degrees and from 270 degrees to 360 degrees and, in the embodiment, disposed in the region from approximately 0 degrees to 75 degrees and from approximately 285 degrees to 360 degrees.

In addition, when the center P3 is the center of the cross sectional shape of the wire 51 and the inner diameter side end 51g is set as 0 degrees, the linear portions 51b are disposed in the region from approximately 75 degrees to 135 degrees and the region from approximately 225 degrees to 285 degrees in the embodiment. Since the length of the linear portions 51b can be changed based on the setting of the oval ratio (which will be described in detail later), other than these angles may be employed.

In addition, when the center P3 is the center of the cross sectional shape of the wire 51 and the inner diameter side end 51g is set as 0 degrees, the curved portion 51c has a length so as to be present in the region from at least 170 degrees to 190 degrees and, in the embodiment, is positioned in the region from approximately 145 degrees to 215 degrees. Although the range of angles in which the curved portion 51c is positioned changes depending on the length of the linear portions 51b as described above, when the curved portion 51c is present in the region from at least 170 degrees to 190 degrees, even if the wire 51 is inclined (falls) less than 10 degrees, reduction in the contact area can be suppressed. The inclination (falling) of the wire 51 will be described in detail later.

When the center P3 is the center of the cross sectional shape of the wire 51 and the inner diameter side end 51g is set as 0 degrees, the arc portions 51d are preferably disposed in the region from 120 degrees to 170 degrees and the region from 190 degrees to 240 degrees though these angles depend on the length of the above linear portions 51b. In the embodiment, the arc portions 51d are positioned in the region from approximately 135 degrees to 145 degrees and the region from approximately 215 degrees to 225 degrees.

Next, the results of simulation of the angle and the maximum shearing stress in the cross sectional shape of the wire 51 described above will be described with reference to FIG. 6. Since the entire coil spring is formed in an arc shape, if the coil spring contracts by receiving a load, approximately 90% of the shearing stress concentrates on the inner diameter side (from 0 degrees to 100 degrees) and the largest shearing stress is generated particularly in the inner diameter side end (0 degrees). However, as is clear from FIG. 6, when the coil spring 50 according to the embodiment contracts by receiving a load, the maximum shearing stress does not concentrate particularly on the inner diameter side end (0 degrees) in the region from 0 degrees to 90 degrees that corresponds to the semi-elliptical portion 51a and the shearing stress is distributed and averaged from 0 degrees to 90 degrees in the inner diameter side part.

In addition, as is also clear from the drawing, from 75 degrees to 135 degrees in which the linear portion 51b is positioned and from 135 degrees to 145 degrees in which the arc portion 51d is positioned, the maximum shearing stress is lower than in the inner diameter side part and, from 145 degrees to 180 degrees in which the curved portion 51c of the outer diameter side part is positioned, the maximum shearing stress is higher than in the arc portion 51d, but lower than in the inner diameter side part.

As described above, in the coil spring 50 according to the embodiment, since the maximum shearing stress is distributed without concentrating on a particular part, the durability is improved.

Next, the number of active turns of the coil will be described. As described above, the area of the cross sectional shape of the wire 51 can be increased by enlarging the arc of the curved portion 51c and making connection to the semi-elliptical portion 51a via the linear portions 51b parallel to the center line. To cause the coil spring 50 to output a designed biasing force, the relationship between the cross sectional secondary moment and the number of active turns of the coil needs to be set as appropriate.

When the cross sectional shape of the wire is, for example, is a rectangle having sides of length h and length b orthogonal to each other, the number of active turns is calculated as described below. That is, the cross sectional secondary moment Iz is represented by the following expressions.

[Math 5]

$$I_Z = \frac{bh^3}{12} \tag{5}$$

When approximation is made using b=h=d, the following expressions are obtained.

[Math 6]

$$I_Z = \frac{d^4}{12} \tag{6}$$

[Math 7]

$$d = \sqrt[4]{12 I_Z} \tag{7}$$

The following expression (8) is obtained by substituting expression (7) above into expression (3) for the number of active turns.

[Math 8]

$$N_a = \frac{3 G I_Z}{2 D^3 k} \tag{8}$$

When expression (4) in which the cross sectional shape is a circle of a radius d is compared with expression (8) in which the cross sectional shape is a square having sides of a length d, the ratio is $8/\pi$ to $3/2$. Accordingly, the value is larger in the case of the circle.

That is, it is found that the number of active turns Na needs to be increased when the cross sectional area of the wire is increased. That is, since the spring becomes hard when the cross sectional area of the wire is increased, the number of turns needs to be increased to set a designed biasing force.

Figure 7:
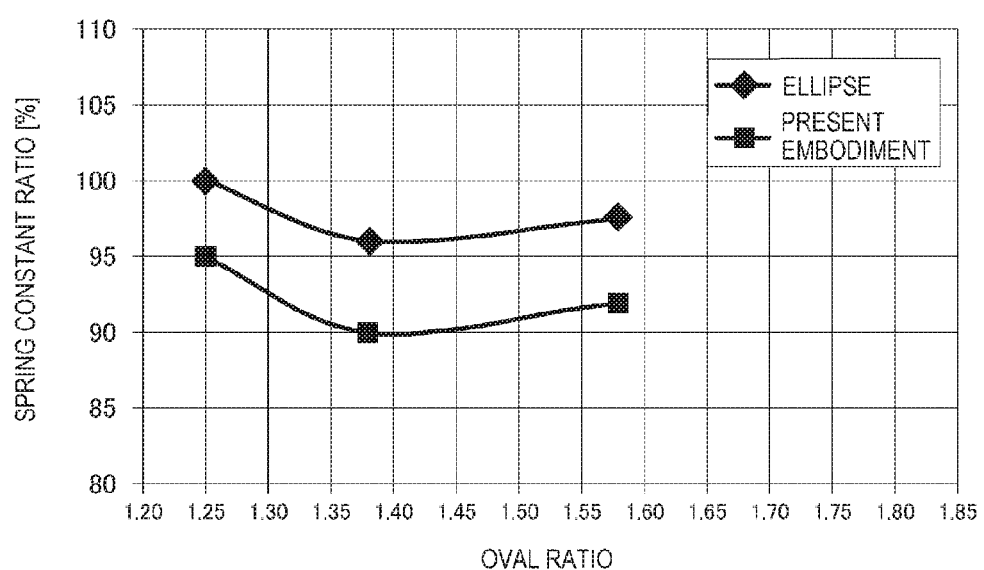
FIG. 7 illustrates the relationship between an oval ratio of the cross sectional shape of the wire and a spring constant ratio.

Referring to FIG. 7, the results of simulation (using a finite element method) of the relationship between the oval ratio and the spring constant ratio will be described. The oval ratio used here is the ratio of the length in the inner-outer diameter direction to the length (maximum length in the direction of the minor radius b) in the width direction in the cross sectional shape of the wire 51, more specifically the value obtained by dividing the length l between the inner diameter side end 51g and the outer diameter side end 51h by the length obtained by doubling the minor radius b. In addition, the spring constant is assumed to be 100% when the cross sectional shape of the wire is elliptical and the oval ratio is 1.25 and the spring constant ratio is calculated based on this.

As is clear from FIG. 7, even when the cross sectional shape of the wire is elliptical, the stiffness can be reduced by making extension in the inner-outer diameter direction so that the oval ratio equals approximately 1.38. As is also clear from the drawing, the stiffness can be further reduced in the cross sectional shape of the wire 51 according to the embodiment as compared with the case in which the cross sectional shape of the wire is elliptical.

When the oval ratio is set by extending the linear portions 51b in the cross sectional shape of the wire 51, the spring constant ratio is approximately 90% at an oval ratio from 1.35 to 1.45, thereby achieving reduction in the stiffness. Although the cross sectional shape of the wire is extended in the inner-outer diameter direction when the oval ratio is increased, if the cross sectional shape is extended in the inner-outer diameter direction in manufacturing a coil by winding the wire, falling (inclination) easily occurs. Therefore, the oval ratio preferably ranges from 1.38 to 1.40 in consideration of such a problem of manufacturing.

When the oval ratio is increased (for example, from 1.25 to 1.40) as described above, the cross sectional area is increased. Since the shearing stress generated in each portion is reduced when the cross sectional area is increased, the number of turns can be increased because the wire diameter (diameter of the wire) can be reduced, thereby reducing the stiffness.

When the calculation method for the number of turns and the oval ratio as described above are considered, in a straight coil spring 50B having the length $L_1$ (illustrated in FIG. 3) that replaces an arc-shaped coil spring 50, the number of turns from the one end 50a to the other end 50b is designed as $N_1$, which is larger than the number ($N_2$) of turns of the coil spring 250. As in the coil spring 250 of the basic shape described above, the arc-shaped coil spring 50 is generally formed by bending the straight coil spring 50B like an arc. However, embodiments other than this example may be used and the arc-shaped coil spring 50 may be formed concurrently with the winding of the wire 51 in a coil shape. That is, the arc shape may be formed in any method. Accordingly, the straight coil spring 50B is not only an example of the straight coil spring 50B, but also a shape before the arc-shaped coil spring 50 is bent like an arc.

As described above, in the coil spring 50 according to the first embodiment, the outer diameter side part includes the curved portion 51c of a curved shape circumscribing the circumscribed circle having the radius c larger than the minor radius b, the arc portions 51d of arc shapes having a large curvature, and the linear portions 51b of linear shapes. Accordingly, as compared with, for example, a basic shape which is a semicircle having the outer diameter side part of the minor radius b, the cross sectional area of the wire 51 can be made larger. In addition, the inner diameter side part is a semi-ellipse-shaped semi-elliptical portion 51a and the inner diameter side part is connected to the linear portion 51b of the outer diameter side part, so the curvature changes slightly and a shearing stress does not easily concentrate. Since the cross sectional area becomes larger and the curvature change becomes smaller as described above, a shearing stress can be distributed and the durability of the coil spring 50 can be improved.

In addition, since the cross sectional shape of the wire 51 includes the linear portions 51b of linear shapes that extend in the inner-outer diameter direction and connect the semi-elliptical portion 51a of the inner diameter side part to the arc portions 51d of the outer diameter side part, it is possible to distribute the stress generated when the coil spring 50 contracts and the wires 51 make contact with each other.

In addition, since the cross sectional shape of the wire 51 includes the arc portions 51d, connecting the curved portions 51c to the linear portions 51b, that have a curvature larger than the curvature of the circumscribed circle 51out, concentration of a stress can be prevented by smoothly connecting the linear portions 51b to the curved portion 51c.

In addition, since the center point P2 of the circumscribed circle 51out is positioned on the inner diameter side in a coil shape of the center point P1 of the semi-elliptical portion 51a, the curvature of the circumscribed circle 51out of the curved portion 51c can be decreased and the stress generated by a centrifugal force when making contact with the cover plate 27 can be distributed.

In addition, when the middle of the straight line connecting the inner diameter side end 51g to the outer diameter side end 51h is the center P3 of the wire 51 and the inner diameter side end 51g of the wire 51 is set as 0 degrees, since the curved portion 51c is present in the region from 170 degrees to 190 degrees, even if the wire is inclined, for example, less than 10 degrees, reduction in the contact area between the cover plate 27 and the wire 51 can be suppressed.

In addition, when the middle of the straight line connecting the inner diameter side end 51g to the outer diameter side end 51h is the center P3 of the wire 51 and the inner diameter side end 51g of the wire 51 is set as 0 degrees, since the semi-elliptical portion 51a is disposed in the region from 0 degrees to 90 degrees and from 270 degrees to 360 degrees, the shearing stress generated in the inner diameter side part can be distributed and the durability of the coil spring can be improved.

In addition, when the middle of the straight line connecting the inner diameter side end 51g to the outer diameter side end 51h is the center P3 of the wire 51 and the inner diameter side end 51g of the wire 51 is set as 0 degrees, the arc portions 51d are preferably disposed in the region from 120 degrees to 170 degrees and the region from 190 degrees to 240 degrees.

In addition, since the ratio of the length l between the inner diameter side end 51g and the outer diameter side end 51h to the maximum length in the direction of the minor radius b ranges from 1.35 to 1.45, it is possible to reduce the wire diameter while increasing the cross sectional area of the wire 51, increase the number of active turns, and reduce the stiffness of the coil spring 50.

In addition, the ratio of the length l between the inner diameter side end 51g and the outer diameter side end 51h to the maximum length in the direction of the minor radius b preferably ranges from 1.38 to 1.40. In this case, the wire 51 is prevented from falling when manufactured.

In addition, since the length l between the inner diameter side end 51g of the inner diameter side part and the outer diameter side end 51h of the circumscribed circle 51out circumscribing the outer diameter side part can be made larger than the length obtained by adding the major radius a to the minor radius b, the cross sectional area of the wire 51 of the coil spring 50 is larger than the cross sectional area of the wire 251 of the basic shape, and the stress concentration can be distributed, thereby improving the durability of the coil spring 50.

In the curved shape circumscribing the circumscribed circle 51out in the outer diameter side part, the curvature of the circumscribed circle 51out is smaller than the curvature of the inscribed circle $C_{1IN}$ of the cover plate 27, the contact area between the cover plate 27 and the wire 51 can be made larger as compared with a wire having a semicircular shape in the outer diameter side part and reduction in the contact area can be suppressed even if the wire 51 is inclined with respect to the cover plate 27 as compared with a wire having linear portions in the outer diameter side part. Therefore, the stress generated by a centrifugal force is substantially distributed and the durability of the coil spring can be improved.

<Second Embodiment>

Figure 8:
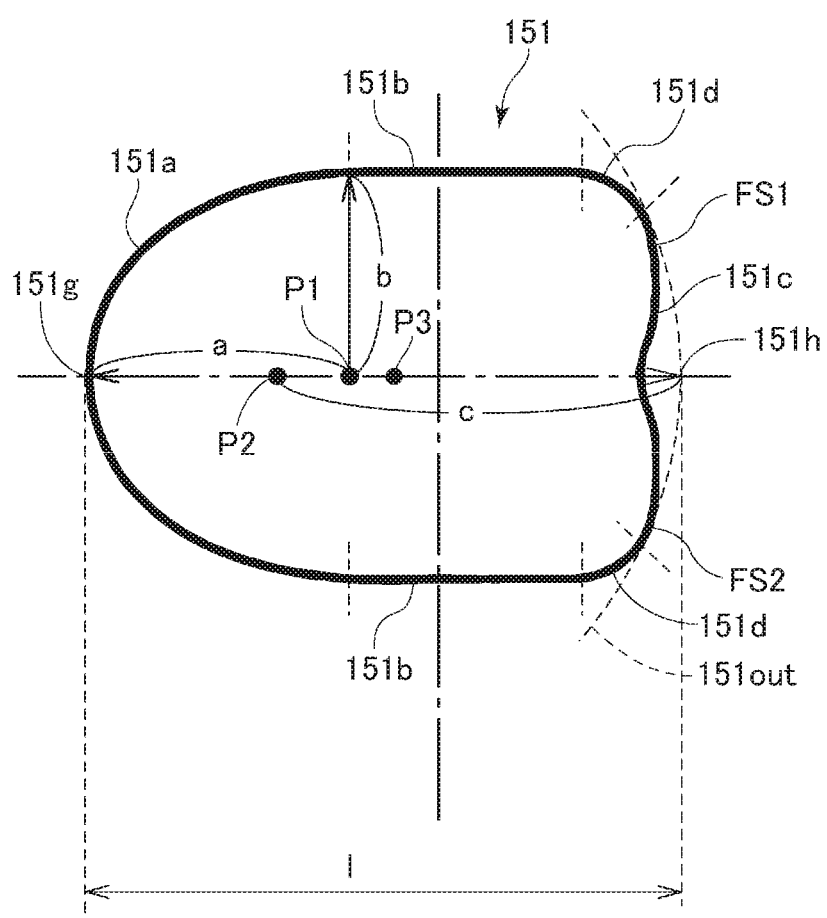
FIG. 8 illustrates the cross sectional shape of the wire of a coil spring according to a second embodiment.

Next, the second embodiment obtained by partially changing the first embodiment above will be described with reference to FIG. 8. In the description of the second embodiment, the same components as in the first embodiment are given the same reference numerals to omit the descriptions.

In the second embodiment, the cross sectional shape of the wire of the coil spring 50 in the first embodiment is changed. Specifically, as illustrated in FIG. 8, the cross sectional shape of a wire 151 includes a semi-elliptical portion 151a, linear portions 151b, arc portions 151d, and a curved portion 151c similarly. Of these components, the shapes of the semi-elliptical portion 151a, the linear portions 151b, and the arc portions 151d are similar to those in the first embodiment.

The curved portion 151c according to the second embodiment circumscribes, via two points, a circumscribed circle 151out having the radius c about the center point P2 disposed in the center line extending in the inner-outer diameter direction from the center point P1. In other words, unlike the curved portion 51c in the first embodiment, the part of the curved portion 151c at which the center line crosses is recessed. The circumscribed circle 151out circumscribing the curved portion 151c is designed to have a curvature equal to or less than the inscribed circle $C_{1IN}$ of the inner surface of the accommodate portion $C_1$ as in the first embodiment (that is, the radius c is equal to or less than the radius D) (see FIG. 2B). When pushed against the inner surface of the accommodate portion $C_1$ by a centrifugal force, the curved portion 151c makes contact with the inner surface at two contact areas FS1 and FS2. For example, when the arc-shaped curved portion 51c as in the first embodiment is used and the radius c is much smaller than radius D, contact with the inner surface of the accommodate portion $C_1$ is made at one point and the contact area is reduced because of the difference in the curvature. However, since contact is made at the two contact areas FS1 and FS2 in the second embodiment, the stress generated by a centrifugal force can be distributed.

Also in the wire 151 according to the second embodiment, the center point P2 of the curved portion 151c is positioned on the inner diameter side (in a coil shape) of the center point P1 of the semi-elliptical portion 151a and the radius c is larger than the radius b (see FIG. 10B) of the basic shape described above. That is, the length l between an inner diameter side end (inner diameter side apex) 151g of the semi-elliptical portion 151a and an outer diameter side end (outer diameter side apex) 151h of the circumscribed circle 151out is larger than the length obtained by adding the major radius a to the radius b of the basic shape. Accordingly, the cross sectional area of the wire 151 is larger than the cross sectional area of the wire 251 of the basic shape.

Since other components, actions, and effects are the same as in the first embodiment, descriptions are omitted.

(Summary Of The Embodiment)

As described above, in the coil spring (50) formed by winding the wire (51 or 151) in a coil shape, the cross sectional shape of the inner diameter side part of the wire (51) in the coil shape includes the substantially semi-elliptical shape (51a or 151a) having the major radius (a) and the minor radius (b), the major radius (a) being oriented in the inner-outer diameter direction, the cross sectional shape of the outer diameter side part of the wire (51) in the coil shape includes a curved shape circumscribing a circumscribed circle having the radius (c) larger than the minor radius (b), the arc shapes having a curvature larger than the curvature of the circumscribed circle, and the linear shapes connecting the arc shapes to the semi-elliptical shape.

Therefore, the outer diameter side part includes the curved shape (51c) circumscribing the circumscribed circle (51out or 151out) having the radius (c) longer than the minor radius (b), the arc shapes (51d) having a large curvature, and the linear shapes (51b), so the cross sectional area of the wire (51) can be made larger than in a wire having a semicircular shape with the radius indicated by the minor radius (b) in the outer diameter side part. In addition, since the inner diameter side part is the semi-elliptical shape (51a) and the inner diameter side part is connected to the linear shape (51b) of the outer diameter side part, the curvature changes slightly and a shearing stress does not easily concentrate. Since the cross sectional area is larger and the curvature change is smaller as described above, a shearing stress can be distributed and the durability of the coil spring (50) can be improved.

In addition, in the coil spring (50), the center point (P2) of the circumscribed circle (51out or 151out) is positioned on the inner diameter side in the coil shape of the center point (P1) of the semi-elliptical shape (51a or 151a).

This can decrease the curvature of the circumscribed circle (51out or 151out) of the curved shape (51c or 151c) and distribute the stress generated by a centrifugal force when making contact with the cover (27).

In addition, in the coil spring (50), when the middle of the straight line connecting the inner diameter side end (51g or 151g) of the inner diameter side part to the outer diameter side end (51h or 151h) of the circumscribed circle (51out or 151out) circumscribing the outer diameter side part is the center (P3) of the cross sectional shape and the inner diameter side end (51g or 151g) of the cross sectional shape is set as 0 degrees, the curved shape (51c or 151c) is present in the region from 170 degrees to 190 degrees.

This can suppress reduction in the contact area between the cover and the wire even when, for example, the wire is inclined less than 10 degrees.

In addition, in the coil spring (50), when the middle of the straight line connecting the inner diameter side end (51g or 151g) of the inner diameter side part to the outer diameter side end (51h or 151h) of the circumscribed circle circumscribing the outer diameter side part is the center (P3) of the cross sectional shape and the inner diameter side end (51g or 151g) of the cross sectional shape is set as 0 degrees, the semi-elliptical shape (51a or 151a) is present in the region from 0 degrees to 90 degrees and from 270 degrees and 360 degrees.

This can distribute the shearing stress generated in the inner diameter side part and improve the durability of the coil spring.

In addition, in the coil spring (50), when the middle of the straight line connecting the inner diameter side end (51g or 151g) of the inner diameter side part to the outer diameter side end (51h or 151h) of the circumscribed circle circumscribing the outer diameter side part is the center (P3) of the cross sectional shape and the inner diameter side end (51g or 151g) of the cross sectional shape is set as 0 degrees, the arc portions (51d or 151d) are present in the region from 120 degrees to 170 degrees and the region from 190 degrees and 240 degrees.

In addition, in the coil spring (50), the ratio of the length between the inner diameter side end (51g or 151g) of the inner diameter side part and the outer diameter side end (51*h* or 151*h*) of the circumscribed circle circumscribing the outer diameter side part to the maximum length in the direction of the minor radius (b) ranges from 1.35 to 1.45.

This can reduce the wire diameter while increasing the cross sectional area of the wire (51 or 151), increase the number of active turns, and reduce the stiffness of the coil spring (50).

Preferably, in the coil spring (50), the ratio of the length between the inner diameter side end (51*g* or 151*g*) of the inner diameter side part and the outer diameter side end (51*h* or 151*h*) of the circumscribed circle circumscribing the outer diameter side part to the maximum length in the direction of the minor radius (b) ranges from 1.38 to 1.40.

The can prevent the wire (51 or 151) from falling when the wire (51 or 151) is manufactured.

In addition, in the coil spring (50), the length (l) between the inner diameter side end (51*g* or 151*g*) of the inner diameter side part and the outer diameter side end (51*h* or 151*h*) of the circumscribed circle (51out or 151out) circumscribing the outer diameter side part is larger than the length obtained by adding the major radius (a) to the minor radius (b).

This can make the cross sectional area of the wire (51 or 151) of the coil spring (50) larger than the cross sectional area of the wire having the basic shape, distribute concentration of a stress, and improve the durability of the coil spring (50).

In addition, in the coil spring (50), when the major radius is a and the minor radius is b, the semi-elliptical shape is represented by $(x/a)^\alpha + (y/b)^\alpha = 1$.

The coil spring (50) is disposed along a rotary direction so as to be present between the two rotating bodies (25 and 26) and so as to be prevented from being moved by a centrifugal force by the cover (27) provided in at least one of the rotating bodies (25), and the curvature of the circumscribed circle (51out or 151out) is smaller than the curvature of the inscribed circle ($C_{1IN}$) in the rotary direction of the cover (27).

This can increase the contact area between the cover (27) and the wire (51) as compared with a wire having a semicircular shape in the outer diameter side part and suppress reduction in the contact area even when the wire (51) is inclined with respect to the cover (27) as compared with a wire having linear portions in the outer diameter side part. Therefore, the stress generated by a centrifugal force is substantially distributed and the durability of the coil spring can be improved.

(Probability of Other Embodiments)

In the first and second embodiments described above, although the linear portions 51*b* or 151*b* extending in parallel to the center line are provided in the cross sectional shape of the wire 51 or 151, the semi-elliptical portion 51*a* or 151*a* may be directly connected to the curved portion 51*c* or 151*c* without using the linear portions 51*b* or 151*b* or the linear portions 51*b* or 151*b* may be formed in an arc shape or other types of curved lines. That is, any cross sectional shape may be used as long as the inner diameter and outer diameter are set so that the wire 51 or 151 can be wound in a coil shape, the cross sectional area is larger than in the basic shapes, and the curvature of the circumscribed circle 51out or 151out of the curved portion 51*c* or 151*c* in contact with the cover is larger.

In addition, although the coil spring is provided in the damper device disposed in the torque converter of an automatic transmission in the embodiment, but other embodiments may be used and the coil spring may be applied to any coil springs such as a return spring used for the clutch of a transmission, a valve spring for an engine, a suspension, and a valve spring.

INDUSTRIAL APPLICABILITY

This coil spring can be used for vehicle power transmission devices such as an automatic transmission and hybrid driving device mounted in a vehicle such as an automobile or truck and, in particular, is preferably used for devices for which durability needs to be improved.

REFERENCE SIGNS LIST

25: rotating body (drive plate)
26: rotating body (first driven plate)
27: cover (cover plate)
50: coil spring
51: wire
51*a*: semi-elliptical shape (semi-elliptical portion)
51*b*: linear shape (linear portion)
51*c*: curved shape (curved portion)
51*d*: arc shape (arc portion)
51*g*: inner diameter side end
51*h*: outer diameter side end
51out: circumscribed circle
151: wire
151*a*: semi-elliptical shape (semi-elliptical portion)
151*b*: linear shape (linear portion)
151*c*: curved shape (curved portion)
151*d*: arc shape (arc portion)
151*g*: inner diameter side end
151*h*: outer diameter side end
151out: circumscribed circle
a: major radius
b: minor radius
c: radius
l: length
$C_{1IN}$: inscribed circle
D: radius
P1: center point
P2: center point
P3: center point

The invention claimed is:

1. A coil spring formed by winding a wire in a coil shape, wherein a cross sectional shape of an inner diameter side part of the wire in the coil shape includes a substantially semi-elliptical shape having a major radius and a minor radius, the major radius being oriented in an inner-outer diameter direction, and a cross sectional shape of an outer diameter side part of the wire in the coil shape includes a curved shape on a radially outermost part of the outer diameter side part circumscribing a circumscribed circle having a radius larger than the minor radius, arc shapes connected to and radially inward of the outermost part having a radius of curvature smaller than a radius of curvature of the circumscribed circle, and linear shapes connecting the arc shapes to the semi-elliptical shape.

2. The coil spring according to claim 1, wherein a center point of the circumscribed circle is positioned on an inner diameter side in the coil shape of a center point of the semi-elliptical shape.

3. The coil spring according to claim 1, wherein, when a middle of a straight line connecting an inner diameter side end of the inner diameter side part to an outer diameter side end of the circumscribed circle circumscribing the outer diameter side part is a center of the cross sectional shape and the inner diameter side end of the cross sectional shape is set as 0 degrees, the curved shape is present in a region from 170 degrees to 190 degrees.

4. The coil spring according to claim 1, wherein, when a middle of a straight line connecting an inner diameter side end of the inner diameter side part to an outer diameter side end of the circumscribed circle circumscribing the outer diameter side part is the center of the cross sectional shape and the inner diameter side end of the cross sectional shape is set as 0 degrees, the semi-elliptical shape is disposed in a region from 0 degrees to 90 degrees and from 270 degrees to 360 degrees.

5. The coil spring according to claim 1, wherein, when a middle of a straight line connecting an inner diameter side end of the inner diameter side part to an outer diameter side end of the circumscribed circle circumscribing the outer diameter side part is the center of the cross sectional shape and the inner diameter side end of the cross sectional shape is set as 0 degrees, the arc shapes are present in a region from 120 degrees to 170 degrees and a region from 190 degrees to 240 degrees.

6. The coil spring according to claim 1, wherein a ratio of a length between an inner diameter side end of the inner diameter side part and the outer diameter side end of the circumscribed circle circumscribing the outer diameter side part to a maximum length in a direction of the minor radius ranges from 1.35 to 1.45.

7. The coil spring according to claim 6, wherein the ratio of the length between the inner diameter side end of the inner diameter side part and the outer diameter side end of the circumscribed circle circumscribing the outer diameter side part to the maximum length in the direction of the minor radius ranges from 1.38 to 1.40.

8. The coil spring according to claim 1, wherein the length between the inner diameter side end of the inner diameter side part and the outer diameter side end of the circumscribed circle circumscribing the outer diameter side part is larger than a length obtained by adding the major radius to the minor radius.

9. The coil spring according to claim 1, wherein, when the major radius is a and the minor radius is b, the semi-elliptical shape is represented by $(x/a)^\alpha + (y/b)^\alpha = 1$.

10. The coil spring according to claim 1, wherein the coil spring is disposed along a rotary direction so as to be present between two rotating bodies and disposed so as to be prevented by a cover provided in at least one of the rotating bodies from being moved by a centrifugal force, and the radius of curvature of the circumscribed circle is larger than a radius of curvature of an inscribed circle in the rotary direction of the cover.

11. The coil spring according to claim 2, wherein, when a middle of a straight line connecting an inner diameter side end of the inner diameter side part to an outer diameter side end of the circumscribed circle circumscribing the outer diameter side part is a center of the cross sectional shape and the inner diameter side end of the cross sectional shape is set as 0 degrees, the curved shape is present in a region from 170 degrees to 190 degrees.

12. The coil spring according to claim 2, wherein, when a middle of a straight line connecting an inner diameter side end of the inner diameter side part to an outer diameter side end of the circumscribed circle circumscribing the outer diameter side part is the center of the cross sectional shape and the inner diameter side end of the cross sectional shape is set as 0 degrees, the semi-elliptical shape is disposed in a region from 0 degrees to 90 degrees and from 270 degrees to 360 degrees.

13. The coil spring according to claim 2, wherein, when a middle of a straight line connecting an inner diameter side end of the inner diameter side part to an outer diameter side end of the circumscribed circle circumscribing the outer diameter side part is the center of the cross sectional shape and the inner diameter side end of the cross sectional shape is set as 0 degrees, the arc shapes are present in a region from 120 degrees to 170 degrees and a region from 190 degrees to 240 degrees.

14. The coil spring according to claim 11, wherein, when the middle of the straight line connecting the inner diameter side end of the inner diameter side part to the outer diameter side end of the circumscribed circle circumscribing the outer diameter side part is the center of the cross sectional shape and the inner diameter side end of the cross sectional shape is set as 0 degrees, the semi-elliptical shape is disposed in a region from 0 degrees to 90 degrees and from 270 degrees to 360 degrees.

15. The coil spring according to claim 14, wherein, when the middle of the straight line connecting the inner diameter side end of the inner diameter side part to the outer diameter side end of the circumscribed circle circumscribing the outer diameter side part is the center of the cross sectional shape and the inner diameter side end of the cross sectional shape is set as 0 degrees, the arc shapes are present in a region from 120 degrees to 170 degrees and a region from 190 degrees to 240 degrees.

16. The coil spring according to claim 15, wherein a ratio of a length between the inner diameter side end of the inner diameter side part and the outer diameter side end of the circumscribed circle circumscribing the outer diameter side part to a maximum length in a direction of the minor radius ranges from 1.35 to 1.45.

17. The coil spring according to claim 16, wherein the ratio of the length between the inner diameter side end of the inner diameter side part and the outer diameter side end of the circumscribed circle circumscribing the outer diameter side part to the maximum length in the direction of the minor radius ranges from 1.38 to 1.40.

18. The coil spring according to claim 17, wherein the length between the inner diameter side end of the inner diameter side part and the outer diameter side end of the circumscribed circle circumscribing the outer diameter side part is larger than a length obtained by adding the major radius to the minor radius.

19. The coil spring according to claim 18, wherein, when the major radius is a and the minor radius is b, the semi-elliptical shape is represented by $(x/a)^\alpha + (y/b)^\alpha = 1$.

20. The coil spring according to claim 19, wherein the coil spring is disposed along a rotary direction so as to be present between two rotating bodies and disposed so as to be prevented by a cover provided in at least one of the rotating bodies from being moved by a centrifugal force, and the radius of curvature of the circumscribed circle is larger than a radius of curvature of an inscribed circle in the rotary direction of the cover.

\* \* \* \* \*